March 31, 1964  W. CARROLL  3,127,246

HEAD GASKET LEAK TESTER

Filed Oct. 2, 1961

INVENTOR.
Warren Carroll
BY
HIS ATTORNEYS

United States Patent Office 3,127,246
Patented Mar. 31, 1964

3,127,246
HEAD GASKET LEAK TESTER
Warren Carroll, 322 W. 3rd St., Greensburg, Pa.
Filed Oct. 2, 1961, Ser. No. 142,165
4 Claims. (Cl. 23—253)

This application relates to a head gasket tester. More particularly, it relates to a tester for the head gaskets of internal combustion engines which have a liquid cooling system.

Internal combustion engines, such as are conventionally used on automobiles, have an engine block in which are bored the cylinders of the engine and an engine head which is bolted to the top of the engine block and which closes the top of the cylinders within the engine block. High pressures are developed within the cylinders of the engine during combustion strokes of pistons within the cylinder and, therefore, head gaskets are provided between the tops of the engine block and the engine head to effectively seal the joint between the block and the head.

In liquid-cooled internal combustion engines, to which this invention particularly pertains, water jackets are formed in the engine block around the cylinders. These jackets are open at the top face of the block and are closed by the engine head when it is bolted to the engine block. For various reasons, leaks will develop in a head gasket long before the gasket "blows" and permits such an escape of the gases during the combustion strokes of an engine that the leak in the gasket is noticeable from loss of power in the engine or from noises audible from outside the engine.

Whenever there is a leak in a head gasket, combustion gases will flow from the combustion chambers into the water in the cooling jackets which surround the cylinders in the engine block. These exhaust gases contain corrosive agents which will seriously and permanently affect the engine long before there is a discernible change in the operation of the engine. I have invented a simple and effective testing device which will indicate leaks in the head gasket before such leaks are noticeable in terms of loss of power of the engine or of external noise.

In the accompanying drawings, I have illustrated a presently preferred embodiment of my invention, in which.

Figure 1:
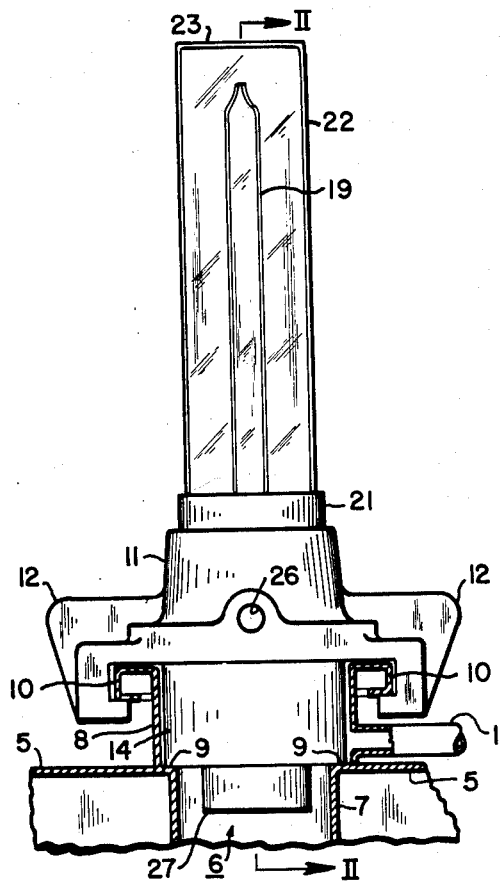
FIGURE 1 is a front elevation of my detector mounted on the filler neck of a radiator of an internal combustion engine, the filler neck and a portion of the radiator being shown in section.

Referring to the drawings, they show a portion of the top of a radiator 5 which is part of the cooling system of an internal combustion engine. The top has an aperture 6 and a downwardly extending collar 7 surrounding the aperture through which liquid may be poured to fill the radiator and the cooling system. The radiator has a second collar 8 which extends upwardly from the top of the radiator and which is larger in diameter than the aperture 6 so as to form with the radiator top a shoulder 9. The collar 8 is concentric with the aperture 6 and with the collar 7 and forms a filler neck for the radiator. The outer end of the collar 8 has a flange 10 which is bent outwardly, downwardly, and then inwardly, as shown in the drawings, to provide part of a bayonet joint whereby a radiator cap can be secured to the top of the filler neck in the conventional manner.

My head gasket tester comprises a base 11 having radially opposed arms 12 which extend outwardly from the base, thence downwardly past the flange 10 on the filler neck of the radiator, and inwardly beneath the flange 10 so that the base 11 can be secured to the top of the filler neck in the same manner that conventional radiator caps are secured to the filler necks of radiators.

The base 11 has a centrally and axially positioned hollow tube 13 integral with the base and extending downwardly from the base when it is in position on a filler neck so as to extend within the filler neck.

A stopper 14 of rubber or other resilient material having a central opening 15 fits tightly around the tube 13 and against the base 11. The stopper is circular in cross-section and has a diameter dimensioned so that it can be inserted within the filler neck and provide a slight clearance with the neck, but still seat firmly on the shoulder 9, thereby sealing the filler neck. Referring to FIGURE 1, it will be seen that, when the tester is in position on the filler neck, the stopper 14 will also close off an overflow tube 16 which is customarily provided on the filler necks of radiators.

The base 11 also has a central passageway 17 which is aligned with and connects with the interior of the tube 13. The passageway 17 has a portion 17a which is the same size as the interior of the tube 13, and an outer portion 17b which is slightly larger in diameter than the portion 17a, thereby forming a shoulder 18 which will support a thin, elongated glass tube 19. The tube 19 contains material for the colorimetric detection of carbon monoxide and other reducing gases. The tube and the detecting material contained within it may be such as are disclosed in Shepherd U.S. Patent No. 2,487,077.

The top of the base 11 has an enlarged bore 20 which receives a cork 21 of rubber or other elastic material. A glass tube 22 closed at one end 23 has its open end fitted into a circular kerf 24 cut in the top of the cork 21 adjacent its periphery.

Figure 2:
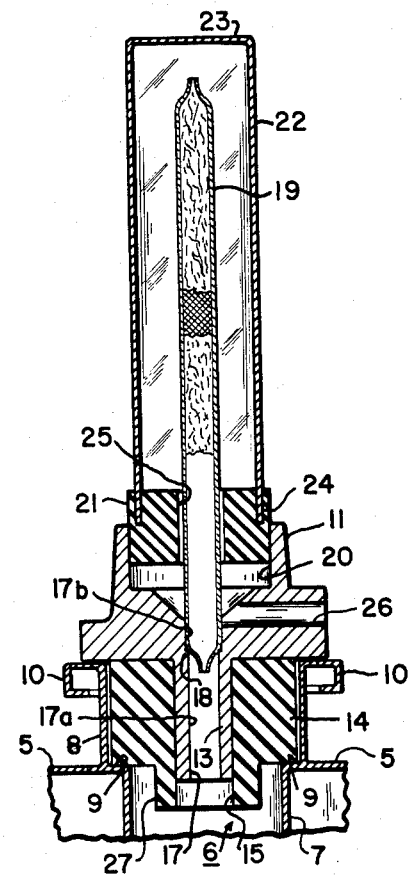
FIGURE 2 is a section along the lines II—II of FIGURE 1.
Figure 3:
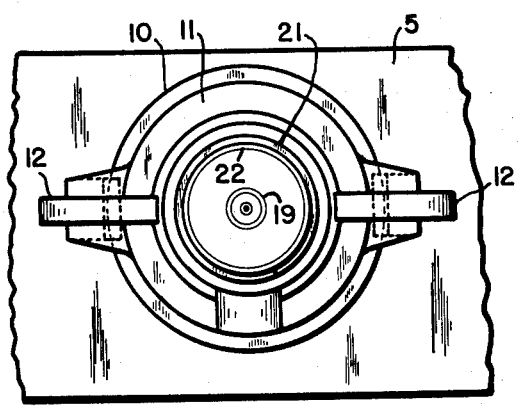
FIGURE 3 is a plan view of the tester shown in FIGURE 1.

As can be seen in FIGURE 2, the portion 17b of the passageway 17 is larger in diameter than the tube 19 and the portion 17b opens into the bore 20. The cork 21 has a central passageway larger in diameter than the tube 19 so as to provide an annular passageway 25 around the tube 19. An outlet passage 26 in the base connects with the bore 20 adjacent the inner end of the tube 22 and leads to atmosphere.

To use my head gasket tester, the engine to be tested is first run to heat it to its normal operating temperature. The radiator cap is then removed from the filler neck and the base of the tester is secured to the neck of the radiator of the automobile being tested, as shown in FIGURES 1 and 2 of the drawings. It should be here noted that a colorimetric gas detector, as shown in Shepherd Patent No. 2,487,077, comprises a glass tube 19 containing carbon monoxide indicating materials which can be used only once. Also, the tubes have sealed tips to preserve the monoxide indicating materials during storage. Therefore, either before or after the base 11 of my tester is secured to a filler cap, the tube 22 is removed from the cork 21 and a tube 19 is inserted through the cork 21 into the portion 17b of the passageway 17, as shown in FIGURE 2, the tips of the tube 19 having been broken so as to open both ends of the tube.

If there is a leak in the head gasket, pressure within the cylinders of the engine will force gases from these cylinders into the water in the cooling jackets which surround the cylinders. Gases thus forced into the water will be pumped with the water containing them to the top of the cylinder, at which point the gases will rise out of the liquid up into the collar 7 and through the aperture 6 into the filler neck and from the filler neck up into the tube 13. The gases will flow around the portion of the tube 19 within the portion 17b of the passageway 17, and a portion of them will flow through the annular space 25 into the tube 22 which thus forms a receptacle for the gases and holds them around the tube 19.

When gas detector tubes such as are shown in the Shepherd Patent No. 2,487,077 are used, the air to be tested is blown or drawn through the tube so that the response of the indicator is to the product of the concentration of the gas being detected times the length of time of exposure of the indicator. The tubes, however, are packed not only with the carbon monoxide indicating materials but also with "guard cells" and "retaining wads" on each side of the carbon monoxide indicating material. Therefore, the tubes offer considerable resistance to the flow of air through them. I cannot provide a tight seal between the portion 17b of the passageway 17 and the tube 19 because, in modern automobiles, pressure within the radiator rises as high as 14 pounds per square inch, and such pressures would blow the tube 19 out of the passageway 17. Therefore, I have found it necessary to provide a gas atmosphere surrounding the tube 19, from which atmosphere gases to be indicated can diffuse into the tubes 19. Positioning the gas outlet 26 adjacent the portion of the tube 22 which is closest to the base 11 insures a gas atmosphere around the tube 19 and within the tube 22.

If any combustion gases escape through the head gasket from the cylinders into the water of the cooling system of the engine being tested, such gases will inevitably contain carbon monoxide and other reducing gases which will cause a change in color in the gas detecting material contained within the tube 19. Therefore, any change in color in this material indicates that there is a leak in the head gasket.

Figure 4:
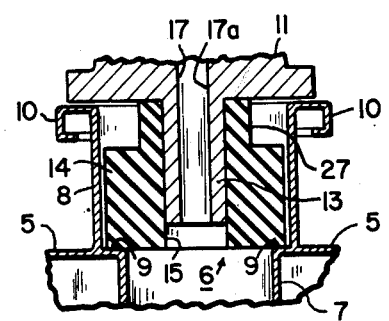
FIGURE 4 is a partial cross-section similar to that of FIGURE 2 but showing a part of my tester in a different operative position.

At the present time, automobiles manufactured in the United States are provided with radiators having necks of two lengths. The rubber stopper 14, which is affixed to the base 11, is designed to accommodate filler necks of either length. Referring to FIGURES 2 and 4, it will be seen that one end of the stopper 14 has a reduced portion 27. If my device is to be used on a car having a radiator with a short filler neck, the rubber stopper 14 is placed on the tube 13 with the portion 27 of reduced diameter extending beyond the end of the tube 13. The main body of the stopper 14 then engages the shoulder 9, as shown in FIGURE 2. If a car having a longer filler neck is being tested, then the stopper 14 is reversed so that the portion 27 of reduced diameter is against the base 11 and the main body of the stopper extends beyond the tube 13 so as to engage the shoulder 9.

From the foregoing description, it is apparent that I have invented a simple, easily used tester for determining whether or not there is a leak in the head gasket of an internal combustion engine. The tester is extremely sensitive so that the tester will indicate a leak in the head gasket long before defects in the head gasket are apparent from loss of power in the automobile or external noise.

While I have described a presently preferred embodiment of my invention, it is to be understood that it may be otherwise variously embodied within the scope of the appended claims.

I claim:

1. A head gasket leak detector for an internal combustion engine having a liquid cooling system, which system includes a radiator and a filler neck for the radiator, said detector including a base, means on said base for securing it to a radiator filler neck, a rubber stopper secured to said base and extending into said neck to close the filler neck, a passageway extending through said base and stopper and leading to the interior of said radiator, a receptacle mounted on said base, said passageway also leading to said receptacle to convey gases introduced into the cooling system to said receptacle and means within the receptacle for holding material indicating the presence of carbon monoxide and the like, said means communicating with said passageway and with the interior of said receptacle.

2. A head gasket leak detector as described in claim 1 in which the means for holding the carbon monoxide indicating material comprises a tube open at both ends, said carbon monoxide material being within said tube, said tube being positioned at least partially within said passageway.

3. A head gasket leak detector as described in claim 1 and having a gas outlet for said receptacle adjacent the portion of said receptacle closest to said base.

4. A head gasket leak detector for an internal combustion engine having a liquid cooling system, which system includes a radiator and a filler neck for the radiator, said detector including a base, means on said base for securing it to a radiator filler neck, a hollow tube extending from said base and opening into the interior of said filler neck, a stopper fitting around said tube and closing said filler neck, a passageway in said base leading from the interior of said tube through the face of said base opposite to said tube, a receptacle mounted on said base on the side of the base opposite to said tube and positioned to receive gases flowing through said tube and passageway, a second tube positioned partially within said passageway and said receptacle, means in said passageway to support said second tube within it, material within said second tube for indicating carbon monoxide and the like, and a gas outlet for said receptacle in said base and communicating with the portion of said receptacle adjacent said base and with atmosphere.

References Cited in the file of this patent
UNITED STATES PATENTS

| | | |
|---|---|---|
| 2,171,113 | Hopkins | Aug. 29, 1939 |
| 2,487,077 | Shepherd | Nov. 8, 1949 |
| 2,888,331 | Carpenter | May 26, 1959 |